「12」 United States Patent
Koshikawa

(10) Patent No.: US 6,785,936 B2
(45) Date of Patent: Sep. 7, 2004

(54) HINGE DEVICE

(75) Inventor: Shinichiro Koshikawa, Yokaichiba (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/258,261

(22) PCT Filed: Feb. 21, 2002

(86) PCT No.: PCT/JP02/01504
§ 371 (c)(1),
(2), (4) Date: Oct. 22, 2002

(87) PCT Pub. No.: WO02/068833
PCT Pub. Date: Sep. 6, 2002

(65) Prior Publication Data
US 2003/0101538 A1 Jun. 5, 2003

(30) Foreign Application Priority Data

Feb. 26, 2001 (JP) .......................................... 2001-050525
Nov. 5, 2001 (JP) .......................................... 2001-339154

(51) Int. Cl.[7] .............................................. E05D 11/10
(52) U.S. Cl. ............................. 16/328; 16/303; 16/330; 16/334
(58) Field of Search .......................... 16/330, 303, 328, 16/334, 332

(56) References Cited

U.S. PATENT DOCUMENTS

| 4,718,127 | A | * | 1/1988 | Rittmann et al. | ............... | 2/424 |
| 5,109,572 | A | * | 5/1992 | Park | ........................... | 16/334 |
| 5,259,019 | A | * | 11/1993 | Stilley | ..................... | 455/575.3 |
| 5,274,882 | A | * | 1/1994 | Persson | .................... | 455/575.3 |
| 5,317,785 | A | * | 6/1994 | Kobayashi | .................. | 16/329 |
| 5,970,819 | A | * | 10/1999 | Katoh | ......................... | 74/531 |
| 5,987,122 | A | * | 11/1999 | Daffara et al. | ......... | 379/433.13 |
| 6,091,938 | A | * | 7/2000 | Go | ........................... | 455/575.3 |
| 6,195,431 | B1 | * | 2/2001 | Middleton | ............. | 379/433.13 |
| 6,305,050 | B1 | * | 10/2001 | Imai | ............................ | 16/303 |

FOREIGN PATENT DOCUMENTS

| JP | 07-011831 A | | 1/1995 |
| JP | 09-233165 A | | 9/1997 |
| JP | 10-065778 A | | 3/1998 |
| JP | 11-050727 A | | 2/1999 |
| JP | 2000-192939 | * | 7/2000 |
| JP | 2001-241254 A | | 9/2001 |
| JP | 2002-106544 A | | 4/2002 |
| JP | 2002-130250 A | | 5/2002 |
| JP | 2002-364629 | * | 12/2002 |
| JP | 2003-214422 | * | 7/2003 |

* cited by examiner

Primary Examiner—Chuck Y. Mah

(57) ABSTRACT

The present invention provides a hinge assembly (1) in which a projection and a cam face for converting a biasing force of bias means (9) into a turn biasing force for turning a turnable member (3) disposed at one end portion of a hinge main body (2) in one direction are disposed between the turnable member (3) and a movable member (4) disposed at the hinge main body (2) in such a manner as to be non-turnable but movable in the axial direction, wherein a second movable member (6) and a second turnable member (5) are disposed at the other end portion of the hinge main body (2), and a second projection and a second cam face for converting a biasing force of the bias means (9) in the same direction as the above-mentioned turn biasing force are disposed between the second movable member (6) and the second turnable member (5). Since two converting portions for converting the biasing force of the bias means into a turn biasing force in the manner as mentioned above are provided, insufficiency of the turn biasing force never occurs.

15 Claims, 11 Drawing Sheets (A)

(B)

(C)

(D)

HINGE DEVICE

TECHNICAL FIELD

This invention relates to a hinge assembly suited to be used for a foldable cellular telephone, and the like, and more particularly to a hinge assembly capable of enlarging the turn biasing force.

BACKGROUND ART

In general, a hinge assembly of this type comprises a circular cylindrical hinge main body, a turnable member turnably but non-movably connected to one end portion of the hinge main body, a movable member movably but non-turnably provided on the hinge main body and disposed opposite the turnable member, and bias means for urging this movable member so as to abut with the turnable member. One of the abutment surfaces of the turnable member and the movable member is provided with a closing direction cam face and an opening direction cam face which are disposed away from each other by a predetermined angle in the circumferential direction. The other abutment surface is provided with a first projection which contacts the closing direction cam face in the vicinity of the closed position and a second projection which contacts the opening direction cam face in the vicinity of the open position.

When the hinge assembly thus constructed is to be used in a foldable cellular telephone, one of the hinge main body and the turnable member is non-turnably connected to a transmission section of the cellular telephone and the other is non-turnably connected to a reception section. When the reception section is located in the vicinity of the closed position, the biasing force of the bias means is converted into a turn biasing force in the closing direction by both the closing direction cam face and first projection. By this turn biasing force, the reception section is turn biased toward the closed position side and held in the closed position where the reception section is in collision with the transmission section. On the other hand, when the reception section is located in the vicinity of the open position, the biasing force of the bias means is converted into a turn biasing force in the opening direction by both the opening direction cam face and second projection. By this turn biasing force, the reception section is held in the open position (see Japanese Patent Application Laid-Open No. H07-11831 and Japanese Patent Application Laid-Open No. H10-65778).

When the hinge assembly is to be attached to the cellular telephone, it is the normal practice that one each of the hinge assemblies is attached to one and the other end portions of the transmission section and the reception section in a direction of the rotation axis. And the reception section is turned with respective to the transmission section through the two hinge assemblies. However, it is inevitable for such two hinge assemblies to have manufacturing errors and attaching errors. Due to those errors, the turnable members of the two hinge assemblies are often slightly displaced in phase. When such displacement in phase should occur, the timing for those two hinge assemblies to start turning of the reception section in the closing or opening direction would be slid, even if one of the hinge assemblies should turn bias the reception section with a turn biasing force of a designed value, the other hinge assembly would turn bias the reception section only with a smaller force than the designed value. As a consequence, the turn biasing force for turning the reception section becomes insufficient in some instances.

Moreover, there would be some cases where the hinge assembly can be attached to only one end side and only a bearing can be attached to the other end side. In those cases, since the reception section is turn biased only by one hinge assembly, the turn biasing force applicable to the receptions section becomes more insufficient.

DISCLOSURE OF INVENTION

An object of the present invention is to provide a hinge assembly in which only one hinge assembly, when used in a cellular telephone, for example, can turn the reception section sufficiently. In order to achieve this object, the present invention provides a hinge assembly comprising a hinge main body, a turnable member turnably disposed at one end side of the hinge main body, a movable member disposed at one end portion of the hinge main body such that the turnable member is movable in a direction of a rotation axis of the turnable member but non-turnable and arranged opposite that end face of the turnable member which is oriented towards the other end side of the hinge main body, and bias means for urging the movable member so as to abut with the turnable member, one of abutment surfaces of the turnable member and the movable member being provided with a projection and the other abutment surface being provided with a cam face for converting a biasing force of the bias means into a turn biasing force for turning the turnable member in one direction by abutment of the cam face with the projection when the turnable member is turned into a predetermined position, characterized in that the hinge assembly further comprises a second turnable member turnably disposed at the other end side of the hinge main body with an axis thereof aligned with the turnable member and non-turnably connected to the turnable member, and a second movable member disposed at the other end portion of the hinge main body such that the second movable member is movable in a direction of a rotation axis of the second turnable member but non-turnable and urged by the bias means so as to abut with that end face of the second turnable member which is oriented towards one end side of the hinge main body, one of abutment surfaces of the second turnable member and the second movable member being provided with a second projection and the other abutment surface being provided with a second cam face for converting a biasing force of the bias means into a turn biasing force which acts in the same direction as the turn biasing force converted by the cam face when the turnable member is turned into the predetermined position.

It is preferred that the turnable member and the second turnable member are non-turnably and non-movably disposed at opposite end portions of a connection shaft which is turnably pierced through the hinge main body. It is more preferred that one of the turnable member and the second turnable member is integrally formed on the connection shaft.

Preferably, a fitting recess for allowing the projection to be detachably fitted therein in accordance with relative turning motion of the turnable member and the movable member is formed in that abutment surface of the abutment surfaces of the turnable member and the movable member on which the cam face is formed, and a second fitting recess for allowing the second projection to be detachably fitted therein in accordance with relative turning motion of the second turnable member and the second movable member is formed in that abutment surface of the abutment surfaces of the second turnable member and the second movable member on which the cam face is formed. It is also preferable that a plurality of the fitting recesses are formed, the fitting recesses are arranged on a circumference about the axis of the turnable member in such a manner as to be away from one another, a plurality of the second fitting recesses are formed, the second fitting recesses are arranged on a circumference about the axis of the second turnable member in such a manner as to be away from one another.

It is also accepted that the fitting recesses and the second fitting recesses are arranged in such a manner as to have mutually different phases in the circumferential directions of the turnable member and the second turnable member, so that the fitting recesses and the second fitting recesses are alternately located in the circumferential directions, or that the fitting recesses and the second fitting recesses are arranged in such a manner as to have a mutually same phase in the circumferential directions of the turnable member and the second turnable member.

BRIEF DESCRIPTION OF DRAWINGS

FIG. 7(A) is a plan view thereof, FIG. 7(B) is a sectional view taken on line B—B of FIG. 7(A), FIG. 7(C) is an enlarged sectional view taken on line C—C of FIG. 7(A), and FIG. 7(D) is an enlarged view of the area indicated by D of FIG. 7(B).

FIG. 8(A) is a plan view of the cellular telephone which is in an open position, FIG. 8(B) is a side view of the cellular telephone, and FIG. 8(C) is an enlarged view of the area indicated by C of FIG. 8.

BEST MODE FOR CARRYING OUT THE INVENTION

Embodiments of the present invention will be described hereinafter with reference to FIGS. 1 through 17. FIG. 8 shows a foldable cellular telephone A in which a hinge assembly 1 according to a first embodiment of the present invention is used. This cellular telephone A includes a transmission section B provided at a front surface b thereof with a microphone and various keys (none of them are shown), and a reception section C provided at a front surface c with a liquid crystal display D and a speaker (not shown). The reception section C is turnably connected to the transmission section B about a rotation axis L by the hinge assembly 1. The turning range of the reception section C is restricted between a closed position and an open position. The closed position is established by collision of the front surface c of the reception section C with the front surface b of the transmission section B. The open position is a location where the reception section C is turned about 160 degrees in a direction as indicated by an arrow of FIG. 8 from the closed position. This open position is established by a stopper mechanism (not shown) which is disposed between the transmission section B and the reception section C.

Figure 11:
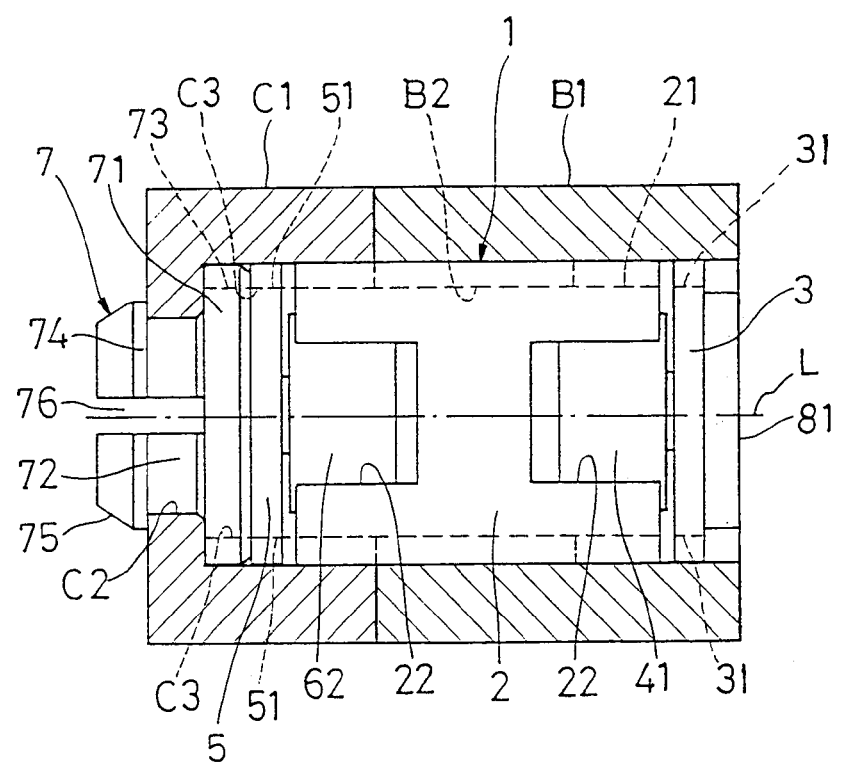
FIG. 11 is a sectional view taken on line X—X of FIG. 8(C), showing a first and a second receiving cylindrical portion in a after-state which the hinge assembly is inserted therein.

Two first receiving cylindrical portions B1 with their axes aligned with the rotation axis L are formed at that end portion of the transmission section B which is located on the reception section C side. The first receiving cylindrical portions B1, B1 are arranged at opposite end portions of the transmission section B in the left and right directions. On the other hand, two second receiving cylindrical portions C1 with their axes aligned with the rotation axis L are arranged at that end portion of the reception section C which is located on the transmission section B side. The second receiving cylindrical portions have a same inside diameter and a same outside diameter as the first receiving cylindrical portions B1. Each second receiving cylindrical portion C1 is arranged such that its outer end face is generally in contact with the inner end face of each first receiving cylindrical portion B1. The first and second receiving cylindrical portions B1, C1, which are adjacent to each other in the left and right directions, form one set. The hinge assembly 1 according to the present invention is, as shown in FIG. 11, received in the first and second receiving cylindrical portions B1, C1 which form the first one set (the right set, in FIG. 8(A), in this embodiment). By this hinge assembly 1, the first one set of first and second receiving cylindrical portions B1, C1 are turnably connected to each other about the rotation axis L and thus, the transmission section B and the reception section C are turnably connected to each other. A known hinge assembly or shaft for merely turnably connecting the first and second receiving cylindrical portions B1, C1 are received in the second one set of first and second receiving cylindrical portions B1, C1. Of course, the hinge assembly 1 according to the present invention may also be received in the second one set of the first and second receiving cylindrical portions B1, C1.

Figure 1:
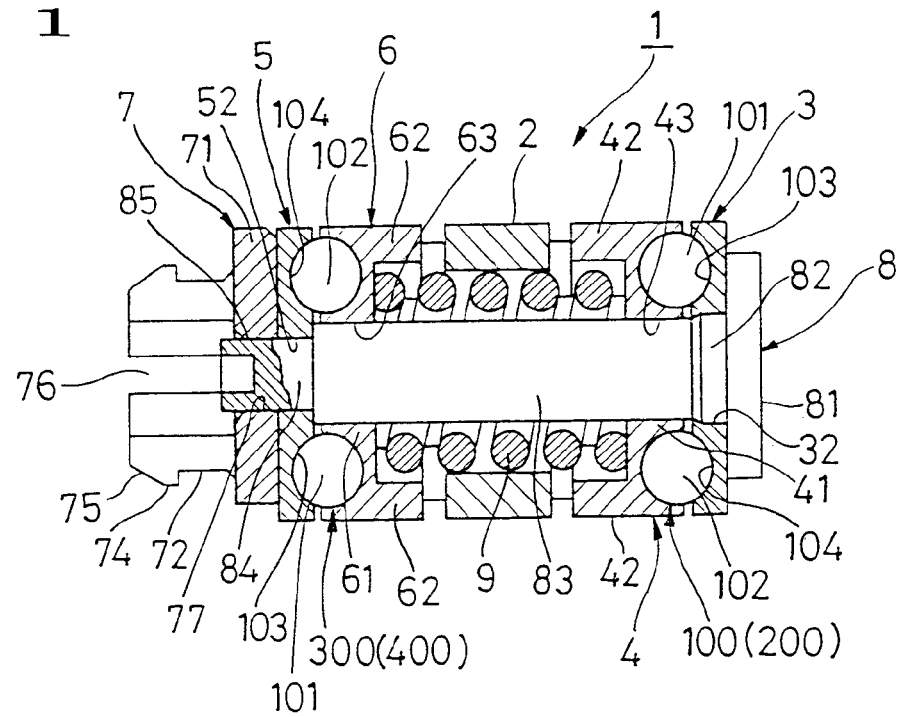
FIG. 1 is a sectional view taken on line X—X of FIG. 3, showing a first embodiment of a hinge assembly according to the present invention.
Figure 2:
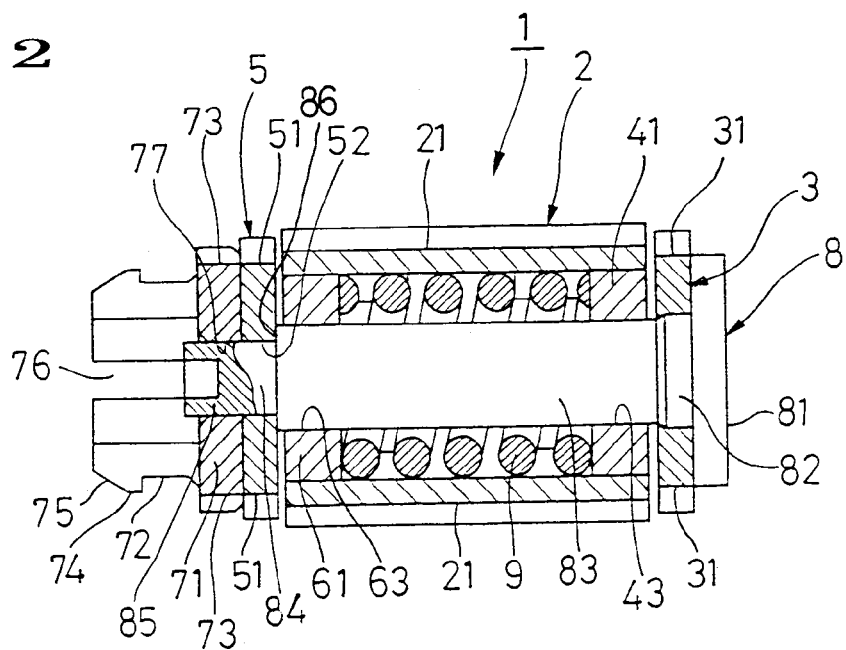
FIG. 2 is a sectional view taken on line X—X of FIG. 4, showing the above hinge assembly.
Figure 3:
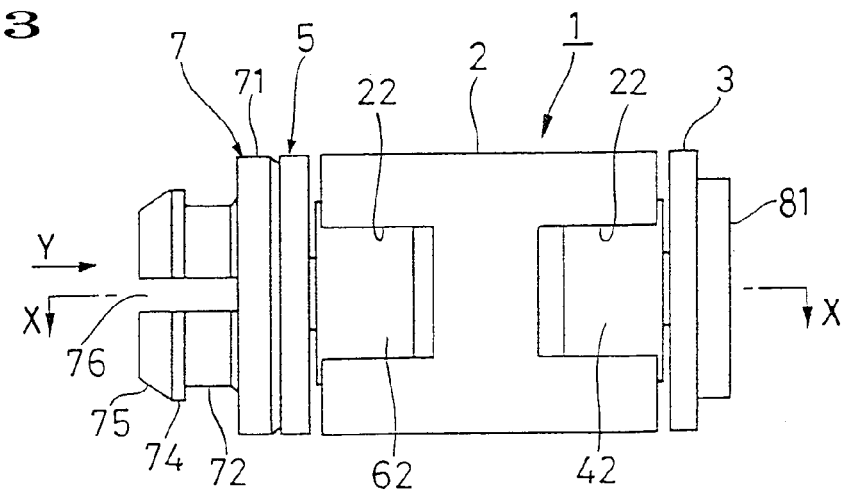
FIG. 3 is a front view of the above hinge assembly.

As shown in FIGS. 1 through 6, the hinge assembly 1 comprises a hinge main body 2, a first turnable member (turnable member) 3 and a first movable member (movable member) 4 which are arranged on the right side (left and right used hereinafter will refer to left and right in FIGS. 1 through 4), in FIG. 1, of this hinge main body 2, a second turnable member 5, a second movable member 6 and a fixed member 7 which are arranged on the left side of the hinge main body 2, a connection shaft 8 for relatively non-movably and non-turnably connecting the first turnable member 3, the second turnable member 5 and the fixed member 7 together, and a coiled spring (bias means) 9 inserted and held in the hinge main body 2.

The hinge main body 2 is formed as a circular cylindrical body whose opposite ends are open. Two key grooves 21, 21 are formed in the outer peripheral surface of the hinge main body 2. The respective key grooves 21, 21 extend over the entire length of the hinge main body 2 and are arranged 180 degrees away from each other in the circumferential direction. A pair of guide grooves 22 are formed in each of the left and right end faces of the hinge main body 2. The first pair of guide grooves 22 extend inwards from the left end face. The second pair of guide grooves 22 extend inwards from the right end face. The pair of guide grooves 22, 22 are arranged 180 degrees away from each other in the circumferential direction of the hinge main body 2 and 90 degrees away from each key groove 21.

As shown in FIG. 11, the most part of the right side of the hinge main body 2 is inserted in the first receiving cylindrical portion B1. By fitting key portions B2, B2, which are formed at the inner peripheral surface of the first receiving cylindrical portion B1, in the key grooves 21, 21 of the hinge main body 2, the hinge main body 2 is non-turnably connected to the first receiving cylindrical portion B1 and thus, non-turnably connected to the transmission section B. The left end portion of the hinge main body 2 is turnably inserted in the outer end portion of the second receiving cylindrical portion C1. By this, the first and second receiving cylindrical portions B1, C1 are turnably connected to each other through the hinge main body 2, and the transmission section B and the reception section C are turnably connected to each other through the rotation axis L.

The first turnable member 3 is formed in a disc-like configuration, which is generally same in outside diameter as the hinge main body 2. The first turnable member 3 is arranged such that its axis is aligned with the axis of the hinge main body 2 and it is generally in contact with the right end face of the hinge main body 2. Two key grooves 31, 31 are formed in the outer peripheral surface of the first turnable member 3. Those two key grooves 31, 31 are formed 180 degrees away from each other in the circumferential direction of the first turnable member 3. In the case of this embodiment, formation of the key groove 31 is not necessarily required because of the reasons to be described hereinafter.

The first movable member 4 comprises a disc portion 41, and a pair of guide portions 42, 42 which are formed on the outer peripheral surface of the disc portion 41. The disc portion 41 is slidingly movably fitted to the inner periphery of the right end portion of the hinge main body 2. On the other hand, the guide portions 42, 42 are arranged 180 degrees away from each other in the circumferential direction of the disc portion 41 and extend from the disc portion 41 along its axis. The respective guide portions 42, 42 are slidingly movably inserted in the guide grooves 22, 22 on the right end side of the hinge main body 2. By this, the first movable member 4 is axially movably but non-turnably connected to the right end portion of the hinge main body 2. Moreover, the first movable member 4 is disposed opposite the left end face of the first turnable member 3.

The second turnable member 5 is formed in a disc-like configuration, which has an outside diameter generally equal to that of the hinge main body 2. The second turnable member 5 is arranged such that its axis is aligned with the axis of the hinge main body 2 and generally in contact with the left end face of the hinge main body 2. Two key grooves 51, 51 are formed in the outer peripheral surface of the second turnable member 5. Those two key grooves 51, 51 are arranged 180 degrees away from each other in the circumferential direction of the second turnable member 5. Each key groove 51 is same in configuration and dimension as the key groove 31 but it is set larger in width in the circumferential direction and in depth than the key groove 21.

As shown in FIG. 11, the second turnable member 5 is inserted in the second receiving cylindrical portion C1. A pair of key portions C3, C3 are formed at the inner peripheral surface of the second receiving cylindrical portion C1. By fitting the pair of key portions C3, C3 in the key grooves 51, 51 of the second turnable member 5, respectively, the second turnable member 5 is non-turnably connected to the second receiving cylindrical portion C1 and is turned in unison with the reception section C.

The second movable member 6 is constructed in the same manner as the first movable member 4 only except that its orienting direction in the left and right directions is reversed to that of the first movable member 4 and it is disposed on the left end portion side of the hinge main body 2. That is, the second movable member 6 also includes a disc portion 61 and a pair of guide portions 62, 62. Also, in the second movable member 6, the disc portion 61 is slidingly movably fitted to the inner periphery of the left end portion of the hinge main body 2, and the guide portions 62, 62 are slidingly movably inserted in the guide grooves 22, 22 on the left side of the hinge main body 2. By this, the second movable member 6 is also axially movably but non-turnably connected to the hinge main body 2. Moreover, the second movable member 6 is disposed opposite the right end face of the second turnable member 5.

The fixed member 7 includes a disc portion 71 and a neck portion 72 extending leftward from a central portion of the left end face of this disc portion 71. The disc portion 71 has an outside diameter generally equal to that of the second turnable member 5. The disc portion 71 is disposed such that its axis is aligned with that of the second turnable member 5 and is in contact with the left end face of the second turnable member 5. A pair of recesses 73, 73 are formed in the outer periphery of the disc portion 71 in such a manner as to be 180 degrees away from each other in the circumferential direction. The recess 73 is set slightly larger in width and depth than the key groove 51 of the second turnable member 5. On the other hand, the neck portion 72 is set smaller in outside diameter than the disc portion 71. A sandwichingly holding projection 7 and a tapered portion 75 which is gradually forwardly reduced in diameter is formed on a distal end portion of the neck portion 72. The outside diameter of the sandwichingly holding portion 74 is also set to be smaller than that of the disc portion 71 but larger than that of the neck portion 72. A plurality (four in this embodiment) of slits 76 extending from the distal end portion of the neck portion 72 to the disc portion 71 are formed in the neck portion 72 in such a manner as to be away from one another by an equal interval in the circumferential direction. By forming those slits 76, the distal end portion of the neck portion 72 becomes elastically deformable in such a manner as to be swing about the basal end portion. By this, the sandwichingly holding projection 74 and the tapered portion 75 can be enlarged/reduced in diameter.

As shown in FIG. 11, the fixed member 7 is inserted in the inner end portion of the second receiving cylindrical portion C1. An annular projection C2 is formed at the inner end portion of the inner peripheral surface of the second receiving cylindrical portion C1. The inside diameter and the length in the axial direction of the annular projection C2 are set to be generally equal to the outside diameter and the length of the neck portion 72 of the fixed member 7. Accordingly, when the fixed member 7 is inserted in the second receiving cylindrical portion C1 through its outer (on the side of the first receiving cylindrical portion B1) opening portion first with the tapered portion 75, the tapered portion 75 is collided with the end portion of the annular projection C2 first. In that state, when the fixed member 7 is further inserted in the second receiving cylindrical portion C1, the neck portion 72 is elastically deformed, and the tapered portion 75 and the sandwichingly holding projection 74 are reduced in diameter. When the sandwichingly holding projection 74 has passed the annular projection C2, the neck portion 72 is returned to its original state and the sandwichingly holding projection 74 is enlarged in diameter until it has the original diameter. As a consequence, both the sandwichingly holding projection 74 and disc portion 71 sandwichingly hold the annular projection C2. By this, the fixed member 7 is positionally fixed to the second receiving cylindrical portion C1 such that the fixed member 7 is non-movable in a direction of the rotation axis L and thus, the entire hinge assembly 1 is positionally non-movably fixed to the second receiving cylindrical portion C1.

Although the key portions C3, C3 are inserted in the recesses 73, 73 of the fixed member 7, the fixed member 7 is never non-turnably connected to the second receiving cylindrical portion C1 through the key portion C3 because the width of the recess 73 is larger than the width of the key portion C3. However, the fixed member 7 is integrally connected to the second turnable member 5 through the connection shaft 8 as later described. Accordingly, the fixed member 7 is turned together with the reception section C.

The first turnable member 3, the first movable member 4, the hinge main body 2, the second movable member 6, the second turnable member 5 and the fixed member 7 are mutually connected through the connection shaft 8. That is, the connection shaft 8 is disposed in such a manner as to align its axis with that of the hinge main body 2. The connection shaft 8 includes, in order from its right end portion towards its left end portion, a disc-like head portion 81, a sectionally regular square first fixed portion 82 formed at a central portion of the left end face of the head portion 81, a sectionally circular shaft portion 83 having a radius smaller than the distance between the opposite sides of the first fixed portion 82, a sectionally regular square second fixed portion 84 having a diagonal length generally equal to the outside diameter of the shaft portion 83, and a sectionally regular square third fixed portion 83 of a size smaller than the second fixed portion 84. Those various portions 81 through 85 are formed such that their axes are aligned with one another.

The first fixed portion 82 of the connection shaft 8 is non-turnably fitted to a sectionally square throughhole 32 which is formed in a central portion of the first turnable member 3. Particularly, in this embodiment, by press fitting the first fixed portion 82 to the throughhole 32, the first turnable member 3 is fixed to the connection shaft 8. The right end portion and the left end portion of the shaft portion 83 of the connection shaft 8 are slidingly movably and turnably fitted to throughholes 43, 63 which are formed in the central portions of the first and second movable members 4, 6, respectively. The second fixed portion 84 of the connection shaft 8 is non-turnably fitted to a throughhole 52 which is formed in the central portion of the second turnable member 5, and the third fixed portion 85 is non-turnably fitted to a throughhole 77 (see FIGS. 1 and 2) which is formed in the central portion of the disc portion 71 of the fixed member 7. Moreover, by caulking the third fixed portion 85, the fixed portion 7 is urged against the second turnable member 5 and in addition, the second turnable member 5 is urged against a stepped surface 86 which is formed between the shaft portion 83 and the second fixed portion 84. By this, the second turnable member 5 is fixed to the second fixed portion 84, and the fixed member 7 is fixed to the third fixed portion 85. As a consequence, the first turnable member 3 and the second turnable member 5 generally sandwichingly hold the hinge main body 2 from the opposite sides, thereby the entire hinge assembly 1 is unitized. Moreover, the first and second turnable members 3, 5 are non-turnably and non-movably connected to each other through the connection shaft 8.

The coiled spring 9 is disposed in a space between the inner peripheral surface of the hinge main body 2 and the outer peripheral surface of the shaft portion 83. This coiled spring 9 is placed in its compressed state. One end of the coiled spring 9 is in abutment with the first movable member 4 and the other end is in abutment with the second movable member 6. Accordingly, by the biasing force of the coiled spring 9, the first movable member 4 is caused to abut with the first turnable member 3 and the second movable member 6 is caused to abut with the second turnable member 5. A first and a second conversion mechanism 100, 200 for converting the biasing force of the coiled spring 9 into a force for turning the first turnable member 3 are disposed between the abutment surfaces of the first turnable member 3 and the first movable member 4. A third and a fourth conversion mechanism 300, 400 for converting the biasing force of the coiled spring 9 into a force for turning the second turnable member 5 are disposed between the second turnable member 5 and the second movable member 6.

The first and second conversion mechanisms 100, 200 disposed between the first turnable member 3 and the first movable member 4 will now be described. A pair of balls 101, 102 are turnably disposed at the right end face of the first movable member 4 which is located opposite the first turnable member 3. The balls 101, 102 each have a same outside diameter and are arranged on a circumference about the axis of the first movable member 4 in such a manner as to be 180 degrees away from each other in the circumferential direction. Instead of each ball 101, 101, a generally semi-spherical projection or mere projection may be integrally formed on the first movable member 4.

Figure 7:
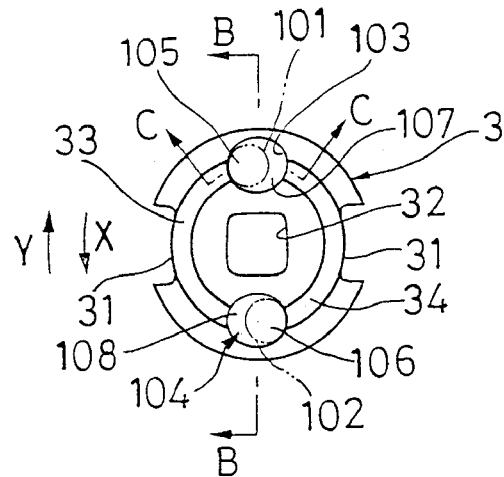
FIG. 7 is an illustration showing a first tunable member of the above hinge assembly.
Figure 7:
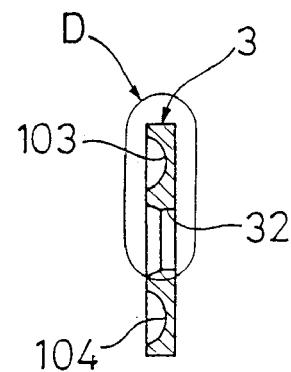
Figure 7:
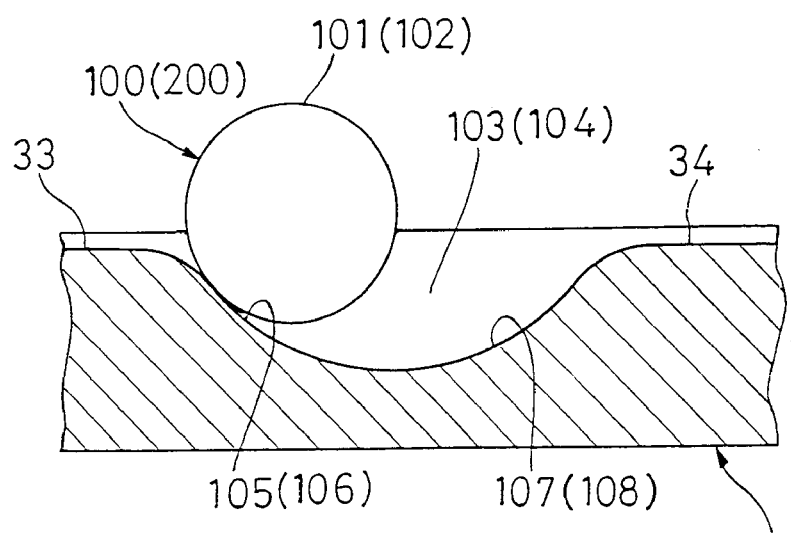
Figure 7:
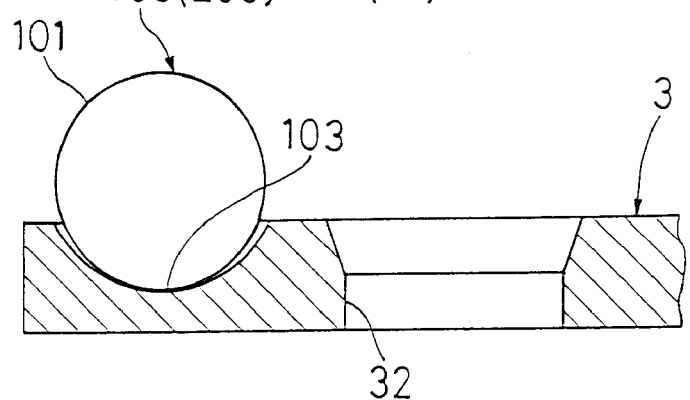
Figure 8:
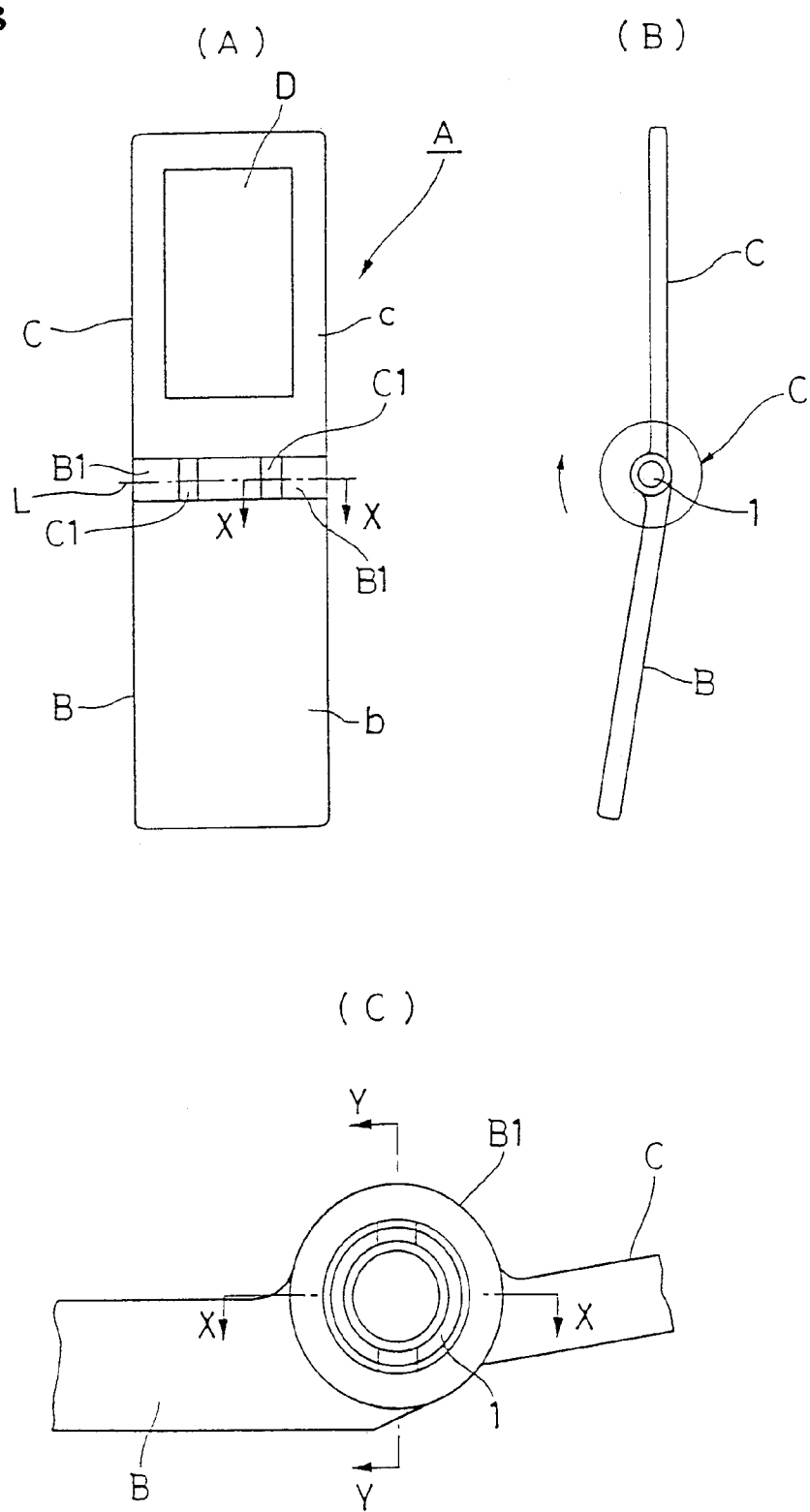
FIG. 8 is an illustration showing a cellular telephone in which a hinge assembly according to the present invention is used.

On the other hand, a pair of engaging recesses 103, 104 having a mutually same configuration and a mutually same dimension are, as shown in FIG. 7, formed in the left end face of the first turnable member 3 which is located opposite the first movable member 4. The pair of engaging recesses 103, 104 are arranged on a circumference about the axis of the first turnable member 3 in such a manner as to be 180 degrees away from each other in the circumferential direction. The circumference on which the pair of engaging recesses 103, 104 are arranged has a same diameter as the circumference on which the balls 101, 102 are arranged. As shown in FIG. 7(D), the radius of curvature of the engaging recesses 103, 104 in a section (section including the radial line of the first turnable member 3) which is orthogonal to the circumferential direction of the first turnable member 3, is set to be equal or slightly larger than the outside diameter of the balls 101, 102. The length (radius of curvature) of the engaging recesses 103, 104 in the circumferential direction of the first turnable member 3 is, as shown in FIG. 7(C), set to be longer than the radius of the balls 101, 102. The depth of each engaging recess 103, 104 is largest at the central portion, i.e., central portion in the circumferential direction of the first turnable member 3 and is gradually reduced in the circumferential direction of the first turnable member 3. However, the depth of each engaging recess 103, 104 is slightly smaller even at the deepest portion than the radius of each ball 101, 102.

Since the depth of the engaging recesses 103, 104 is largest at the central portion, when the balls 101, 102 are located at the central portions of the engaging recesses 103, 104, the first turnable member 3 is merely pushed rightwards by the coiled spring 9 through both the fist movable member 4 and balls 101, 102 and is never turn biased. Accordingly, the first turnable member 3 is held in a constant turning position without turning. In that state, the key groove 31 of the first turnable member 3, the key groove 51 of the second turnable member 5 and the recess 73 of the fixed member 7 are located on the same circumference as the key groove 21 of the hinge main body 2.

Since the radius of curvature in a section in the circumferential direction of the engaging recesses 103, 104 is set to be larger than the radius of the balls 101, 102, when the balls 101, 102 are displaced from the central portions of the engaging recesses 103, 104 in the circumferential direction, the balls 101, 102 come to contact with the inclination portions which form parts of the bottom surfaces of the engaging recesses 103, 104. As a consequence, the first tunable member 3 is turn biased by the coiled spring 9 through the first movable member 4. That is, as shown in FIG. 7(C), if an arrangement is made such that those portions of the bottom surfaces of the engaging recesses 103, 104 which extend in one direction from the centers along the circumference serve as first inclination surfaces (cam faces) 105, 106, and those portions which extend in the other direction serve as second inclination surfaces (cam faces) 107, 108, respectively, when the balls 101, 102 are in contact with the inclination surfaces 105, 106, respectively, the first inclination surfaces 105, 106 act as cam faces. As a consequence, the biasing force of the coiled spring 9 is converted into a turn biasing force for turn biasing the first turnable member 3 in a direction as indicated by an arrow X (closing direction). By this turn biasing force, the first tunable member 3 is turn biased in the closing direction.

When the first turnable member 3 is turned about 140 degrees to 150 degrees in a direction as indicated by an arrow Y from a state in which the balls 101, 102 are in contact with the first inclination surfaces 105, 106, respectively, the balls 101, 102 are rollingly moved within the guide grooves 33, 34 which are formed between the engaging recesses 103, 104, and then brought into the engaging recesses 104, 103, respectively. Then, the balls 101, 102 are contacted with the second inclination surfaces 108, 107, respectively. In that state, by cam action of the second inclination surfaces 107, 108, the biasing force of the coiled spring 9 is converted into a turn biasing force for turn biasing the first turnable member 3 in a direction (opening direction) as indicated by an arrow Y. By this turn biasing force, the first turnable member 3 is turn biased in the opening direction. Of course, in the state in which the balls 101, 102 are in contact with the second inclination surfaces 108, 107, respectively, when the first turnable member 3 is turned 140 degrees to 150 degrees in a direction as indicated by an arrow X, the balls 101, 102 are brought into contact with the first inclination surfaces 105, 106 via the guide grooves 33, 34, respectively. As apparent from the foregoing, the first conversion mechanism 100 is constructed by the balls 101, 102 and the first inclination surfaces 105, 106, and the second conversion mechanism 200 is constructed by the balls 101, 102 and the second inclination surfaces 107, 108.

On the other hand, a third and a fourth conversion mechanism 300, 400, which are disposed between the second turnable member 5 and the second movable member 6 are constructed in the same manner as the first and the second conversion mechanism 100, 200, respectively. When the first conversion mechanism 100 turns the first turnable member 3 in the closing direction (direction as indicated by an arrow X in FIG. 7), the third conversion mechanism 300 turns the second turnable member 5 in the direction as indicated by the arrow X, and when the second conversion mechanism 200 turns the first turnable member 3 in the opening direction (direction as indicated by an arrow Y in FIG. 7), the fourth conversion mechanism 400 turns the second turnable member 5 in a direction as indicated by the arrow Y. Therefore, detailed description of the third and fourth conversion mechanisms 300, 400 is omitted.

The procedure for receiving the hinge assembly 1 having the above-mentioned construction in the first and second receiving cylindrical portions B1, C1 on the right side will be described next.

Figure 4:
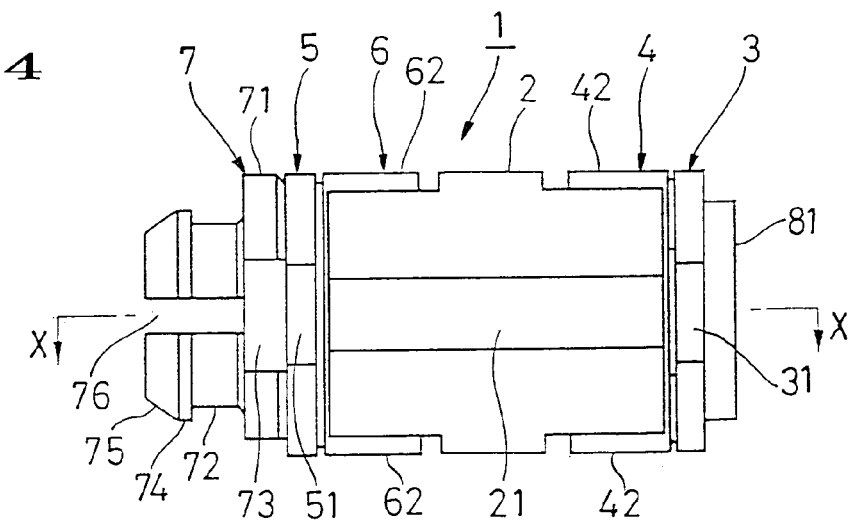
FIG. 4 is a plan view of the above hinge assembly.
Figure 5:
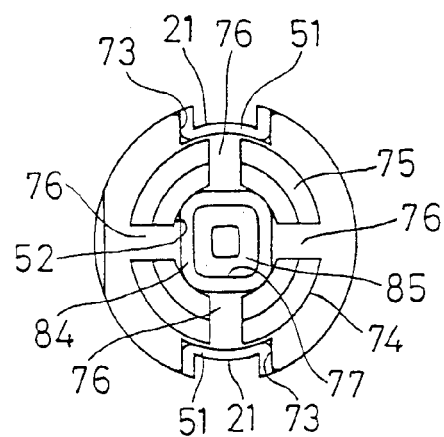
FIG. 5 is a view when viewed in a direction as indicated by an arrow Y of FIG. 3.
Figure 6:
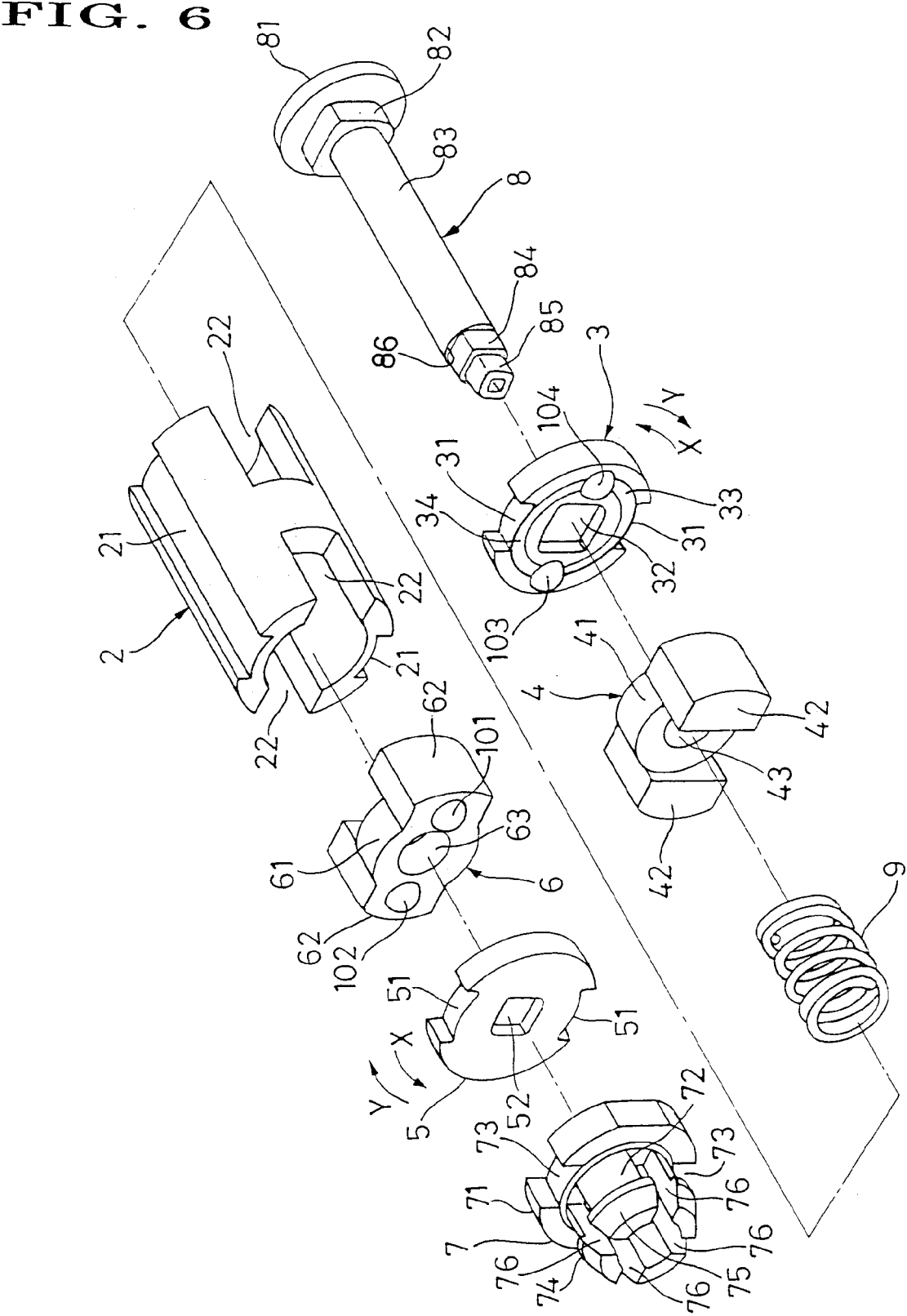
FIG. 6 is an exploded perspective view of the above hinge assembly.
Figure 9:
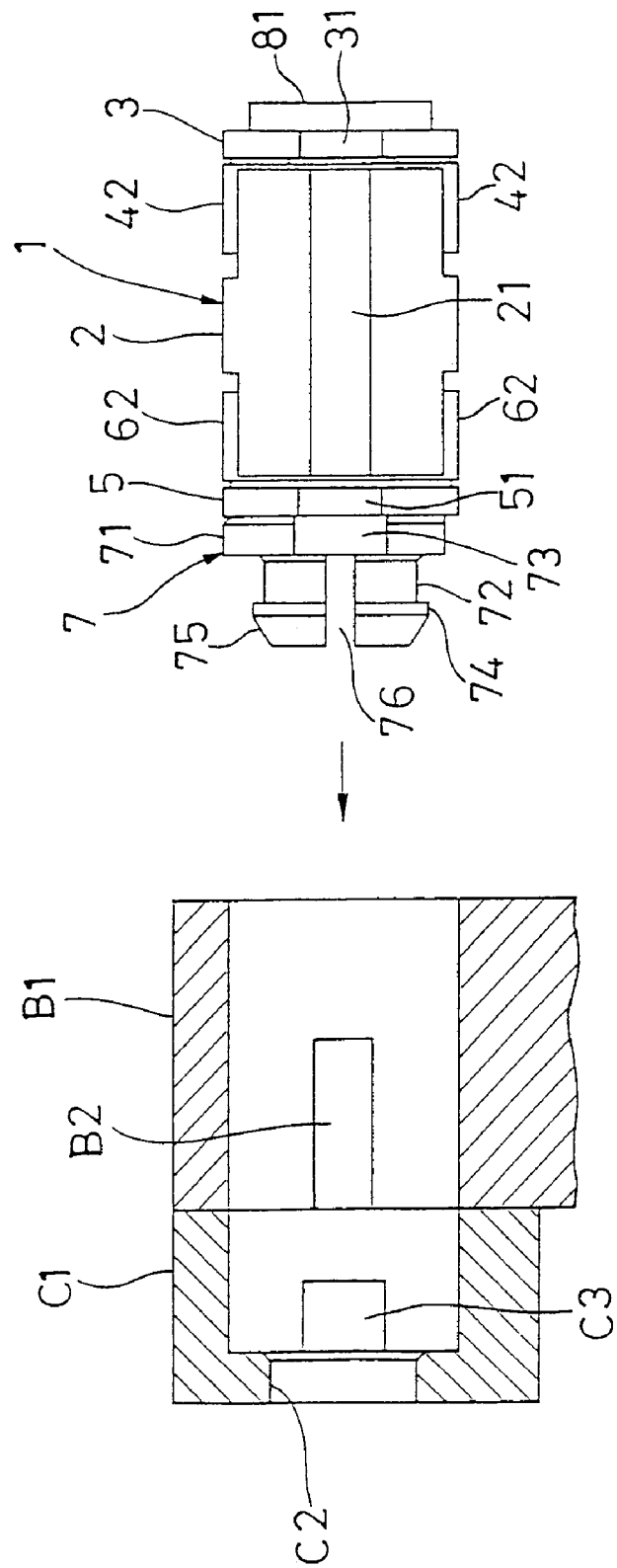
FIG. 9 is a sectional view taken on line X—X of FIG. 8(C), showing a first and a second receiving cylindrical portion in a before-state which the hinge assembly is inserted therein.
Figure 10:
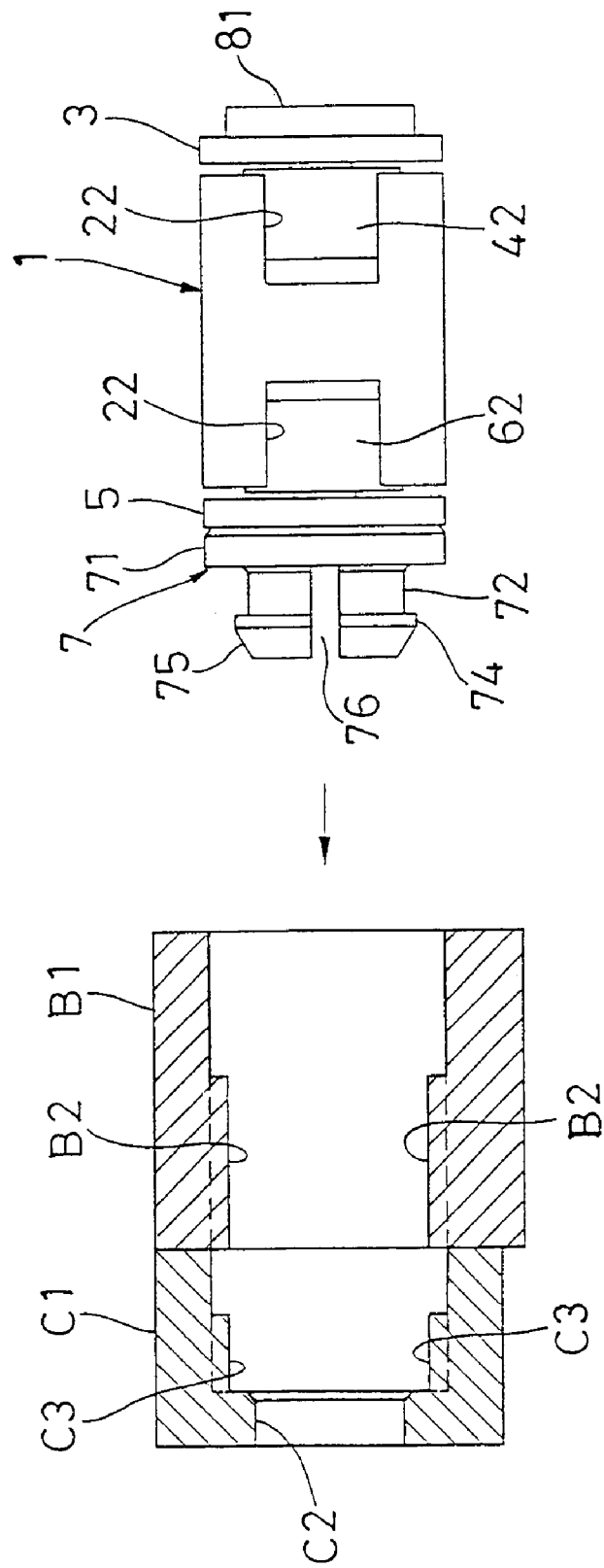
FIG. 10 is a sectional view taken on line Y—Y of FIG. 8(C), showing a first and a second receiving cylindrical portion in a before-state which the hinge assembly is inserted therein.

As shown in FIGS. 9 and 10, the axes of the first and second receiving cylindrical portions B1, C1 are aligned with the rotation axis L. Then, the key portion B2 of the first receiving cylindrical portion B1 and the key portion C3 of the second receiving cylindrical portion C1 are linearly arranged. This can be achieved by turning the transmission section B and the reception section C about 180 degrees from the closed position. On the other hand, with respect to the hinge assembly 1, the balls 101, 102 are brought to the central portions of the engaging recesses 103, 104, respectively. Then, as shown in FIGS. 4 and 9, the key groove 21 of the hinge main body 2, the key grooves 31, 51 of the first and second turnable members 3, 5 and the recess 73 of the fixed member 7 are aligned. Next, the positioning alignment of the key grooves 21, 31, 51 and the recess 73 in the circumferential direction is made with respect to the key portions B2, C3. Thereafter, the hinge assembly 1 is inserted in the first receiving cylindrical portion B1 and the second receiving cylindrical portion C1 through the outer opening portion of the first receiving cylindrical portion B1 first with the fixed member 7.

When the hinge assembly 1 has been inserted into the first and second receiving cylindrical portions B1, C1 until it reaches a predetermined position shown in FIG. 11, the disc portion 71 and the sandwichingly holding projection 74 of the fixed member 7 sandwichingly hold the annular projection C2 of the second receiving cylindrical portion C1. By this, the hinge assembly 1 is positionally fixed to the second receiving cylindrical portion C1 and prevented from escaping from the first and second receiving cylindrical portions B1, C1. In that state, most part of the right side of the hinge main body 2 is non-turnably fitted to the first receiving cylindrical portion B1, and the end portion of the left side of the hinge main body 2 is turnably fitted to the second receiving cylindrical portion C1. By this, the first and second receiving cylindrical portions B1, C1 are turnably connected to each other and thus, the transmission section B and the reception section C are turnably connected to each other. By fitting the key portion C3 of the second receiving cylindrical portion C1 in the key groove 51 of the second turnable member 5, the second turnable member 5 is non-turnably connected to the second receiving cylindrical portion C1 and thus, non-turnably connected to the reception section C. Of course, since the first turnable member 3 is non-turnably connected to the second turnable member 5 through the connection shaft 8, it is also non-turnably connected to the reception section C. The key portion B2 of the first receiving cylindrical portion B1 is never fitted in the key groove 31 of the first turnable member 3. Accordingly, the first turnable member 3 is turnable with respect to the first receiving cylindrical portion B1. Thus, there is no need of formation of the key groove 31.

After the hinge assembly 1 is received in the first and second receiving cylindrical portions B1, C1 of the cellular telephone A in the manner as mentioned above, the reception section C is turned a predetermined angle, for example, about 20 degrees, towards the closed position side with respect to the transmission section B. By doing so, the reception section C is located at the open position. Thereafter, a stopper mechanism is attached between the transmission section B and the transmission section C, so that the reception section C is prevented from turning from the closed position side towards the open position side beyond the open position. In a state in which the reception section C is located in the open position, the balls 101, 102 are in contact with the second inclination surfaces 108, 107, respectively, and the reception section C is turn biased from the closed position side towards the open position side by the biasing force of the coiled spring 9. As a consequence, the reception section C is held in the open position.

When the reception section C is turned a predetermined angle, for example, about 10 to 20 degrees towards the closed position side against the biasing force of the coiled spring 9, the balls 101, 102 are brought out of the engaging recesses 104, 103 and rollingly moved within the guide grooves 33, 34, respectively. In that state, since no turn biasing force acts on the reception section C, the reception section C can be stopped at any desired position.

When the reception section C is turned a predetermined angle, for example, 140 degrees to 150 degrees from the open position, the balls 101, 102 are brought into the engaging recesses 103, 104 and contacted with the first inclination surfaces 105, 106, respectively. As a consequence, the reception section C is turn biased from the open position side towards the closed position side by the biasing force of the coiled spring 9 through the first and third conversion mechanisms 100, 300. By this turn biasing force, the reception section C is turned until its front surface c is collided with the front surface b of the transmission section B and held in the closed position.

In the above cellular telephone A with the hinge assembly 1 attached thereto, it is presumed that the reception section C is located at the closed position. In that state, when the reception section C is turned towards the open position side, the balls 101, 102 are brought out of the engaging recesses 103, 104 and brought into the guide grooves 33, 34, respectively against the turn biasing force of the first and third conversion mechanisms 100, 300. If the length of the coiled spring 9 at the time the reception section C is located at the closed position, is represented by L and the moving distance (=moving distance of the first and second movable members 4, 6) of the balls 101, 102 which are moved by the first conversion mechanism 100 in a direction of the rotation axis L is represented by $\Delta L$, the length L1 of the coiled spring 9 at the time the balls 101, 102 have been brought out of the engaging recesses 103, 104, respectively, becomes as follows;

$L1=L-2\Delta$ because two conversion mechanisms of the first and third conversion mechanisms 100, 300 are used as a conversion portion for converting the biasing force of the coiled spring 9 into a turn biasing force, in other words, because two sets of the first inclination surfaces 105, 106 as cam faces are used. As apparent from the foregoing, in the hinge assembly 1 of the present invention, when the coiled spring 9 is brought out of the engaging recesses 103, 104 and brought into the guide grooves 33, 34, it is compressed by $2\Delta L$. Thus, when compared with the conventional hinge assembly in which only one of the first conversion mechanism 100 and the third conversion mechanism 300 is provided, the amount of compression of the coiled spring 9 is increased by twice.

When the balls 101, 102 are brought into the engaging recesses 104, 103, respectively by further turning the reception section C towards the open position side, the biasing force of the coiled spring 9 is converted, by the second and fourth conversion portions 200, 400, into a turn biasing force towards the open position side from the closed position side. By this turn biasing force, the reception section C is further turned and held in the open position. At that time, since the amount of deformation of the coiled spring 9 is $2\Delta L$ which is twice as large as the amount of deformation of the conventional hinge assembly, it is possible that the reception section C is turned into the open position and held there with a sufficiently large force. The same is true when the reception C is turned from the open position towards the closed position side.

Figure 12:
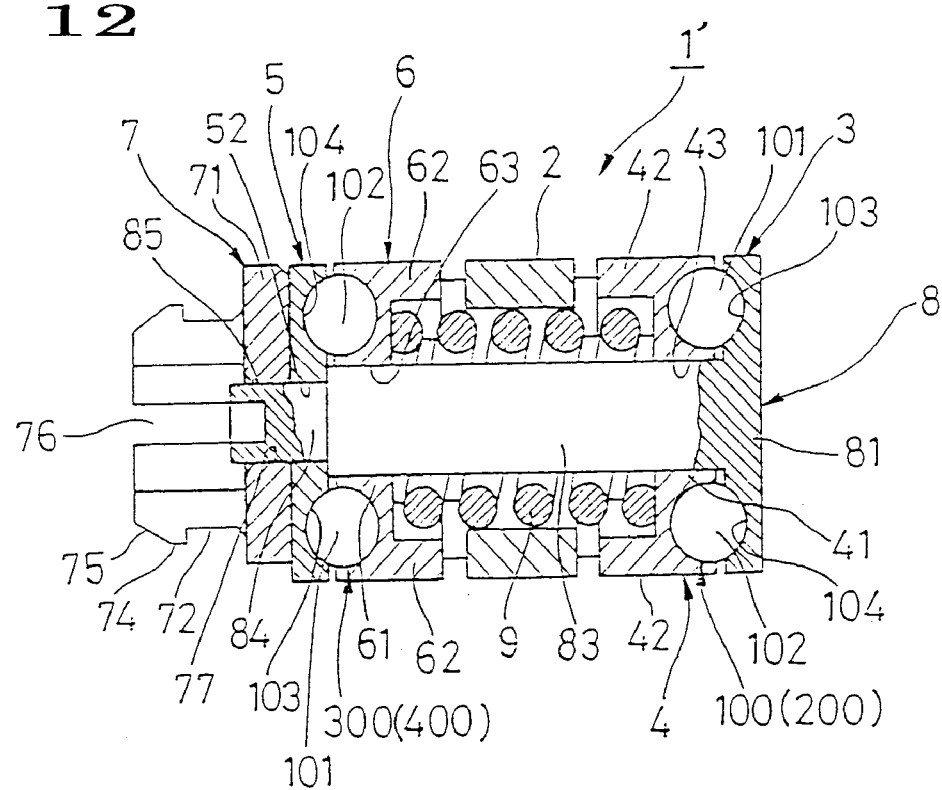
FIG. 12 is a sectional view, similar to FIG. 1, showing a second embodiment of a hinge assembly according to the present invention.

FIG. 12 shows a second embodiment of a hinge assembly according to the present invention. In a hinge assembly 1' in this second embodiment, the outside diameter of the head portion 81 of the connection shaft 8 is set to be generally equal to that of the hinge main body 2, and this head portion 81 is also used as the first turnable member (turnable member). Accordingly, the engaging recesses 103, 104 and the guide grooves 33, 34 (see FIG. 7) are formed at the left end face of the head portion 81 which is located opposite the first movable member 4. All the remaining construction is same as above-mentioned hinge assembly 1.

In this hinge assembly 1', since the head portion 81 is also used as the first turnable member, the number of the component parts can be reduced to that extent, and thus, the manufacturing cost of the hinge assembly 1' can be reduced.

Figure 13:
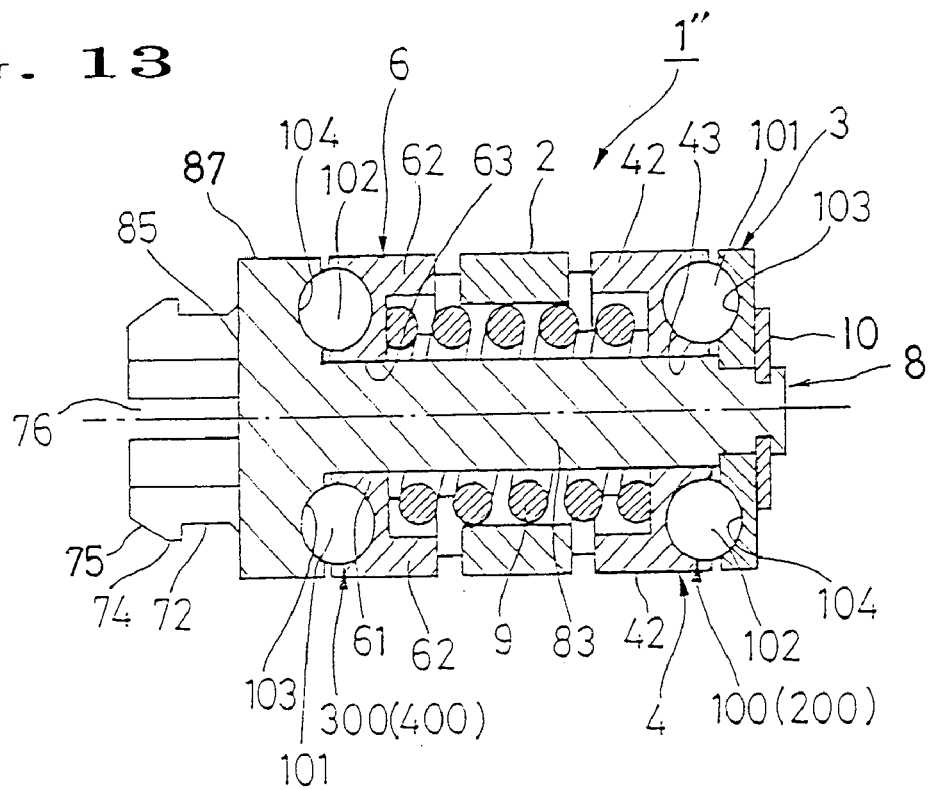
FIG. 13 is a sectional view, similar to FIG. 1, showing a third embodiment of a hinge assembly according to the present invention

FIG. 13 shows a third embodiment of a hinge assembly according to the present invention. In a hinge assembly 1" of this third embodiment, the second turnable member 5 and the fixed member 7 are integral with the connection shaft 8. That is, a sectionally circular composite portion 87 is formed on the left end portion, in FIG. 13, of the connection shaft 8 such that its axis is aligned with that of the connection shaft 8. This composite portion 87 is also used as the second turnable member 5 and the disc portion 71 of the fixed member 7. Accordingly, the outside diameter of the composite portion 87 is set to be equal to those of the second turnable member 5 and the disc portion 71. Between the composite portion 87 and the movable member 6, the third and fourth conversion mechanisms 300, 400 are disposed. Moreover, a key groove (not shown) having a same depth and a same width as the key groove 51 is formed in the outer peripheral surface of the composite portion 87 such that the key groove traverses the composite portion 87 in the axial direction of the composite portion 87. In addition, a neck portion 72 is formed at the left end face of the composite portion 87. Of course, the annular projection 74 is formed at the distal end portion of the neck portion 72, and the slits 76 are formed in the annular projection 74 and the neck portion 72. The first turnable member 3 is non-turnably connected to the right end portion of the connection shaft 8, and the first turnable member 3 is prevented from escaping rightwards, in FIG. 13, from the connection shaft 8 by the stopper 10. All the remaining construction is same as the above hinge assembly 1.

In the hinge assembly 1" of this third embodiment, since the second turnable member 5 and the fixed member 7 are integrally disposed at the connection shaft 8, the number of component parts can further be reduced than that of the hinge assembly 1' of the second embodiment and thus, the manufacturing cost can further be reduced.

Figure 14:
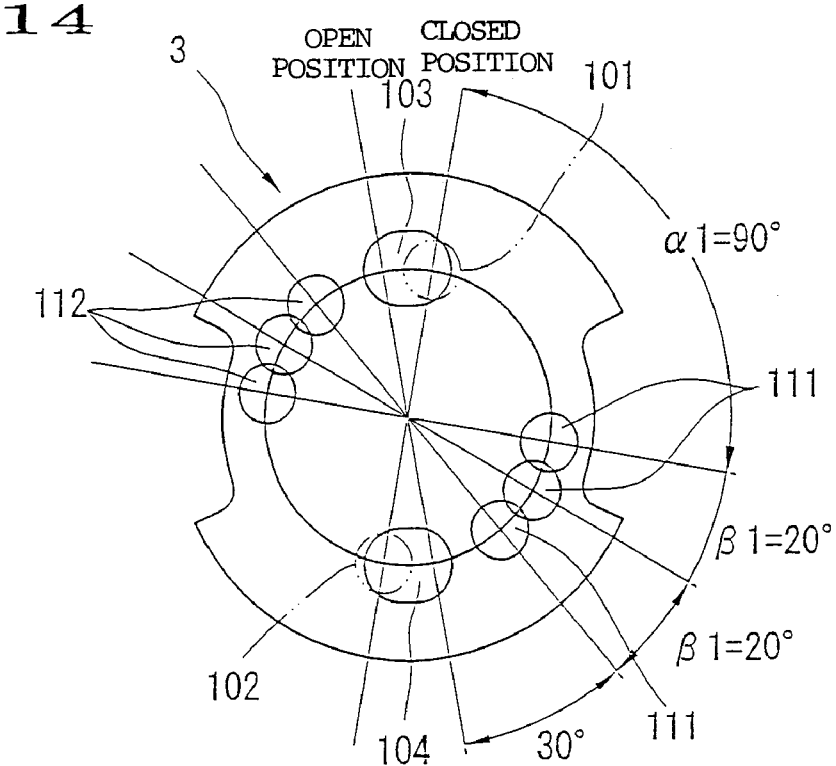
FIG. 14 is a plan view showing a first turnable member in a fourth embodiment of a hinge assembly according to the present invention.
Figure 15:
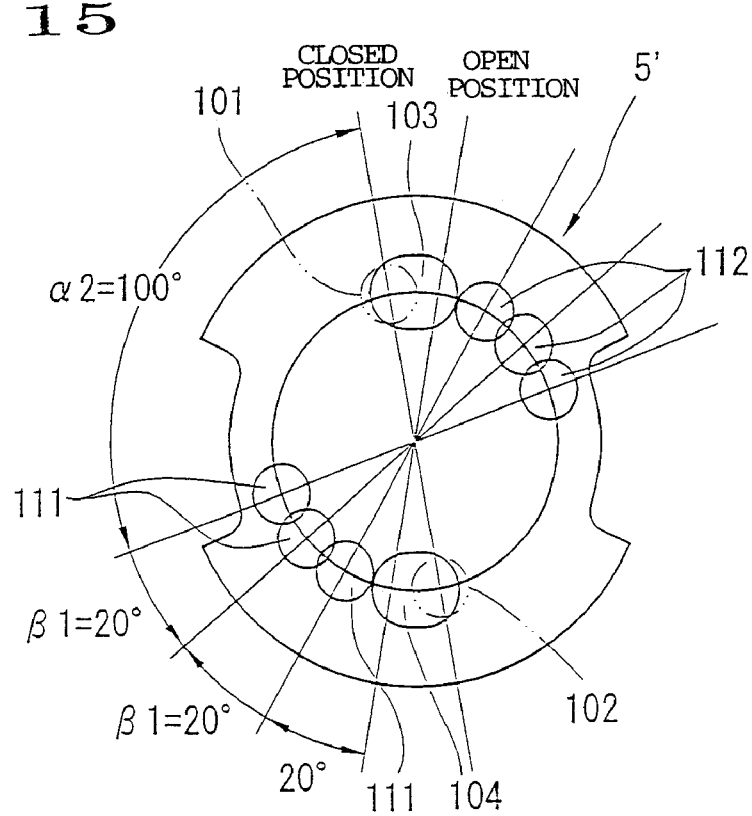
FIG. 15 is a plan view showing a second turnable member in a fourth embodiment of a hinge assembly according to the present invention.

A fourth embodiment of a hinge assembly according to the present invention will be described next. In this fourth embodiment, a first turnable member 3' of FIG. 14 is used instead of the above first turnable member 3, and a second turnable member 5' of FIG. 15 is used instead of the above second turnable member 5. All the remaining construction is same as the above hinge assembly. Therefore, in this embodiment, only the first and second turnable members 3', 5', particularly only those constructions which are different from the first and second turnable members 3, 5 will be described.

First fitting recesses 111, 112 are formed in that surface of the first turnable member 3' where the engaging recesses 103, 104 are formed. At least one each of the first fitting recesses 111, 112 are formed. Moreover, the number of the first fitting recesses 111 is equal to that of the first fitting recesses 112. In this embodiment, the number of the first fitting recesses 111, 112 is equally three.

The first fitting recesses 111 each have a bottom surface whose radius of curvature is generally equal to the radius of the ball 101 so that the ball 101 is detachably fitted thereto. Moreover, the respective first fitting recesses 111 are arranged on the same circumference on which the engaging recesses 103, 104 are arranged. Accordingly, when the first turnable member 3' is turned about its axis, the ball 101 is sequentially fitted to the respective first fitting recesses 111 in accordance with the turning motion of the first turnable member 3'. That first fitting recess 111 of all the first fitting recesses 111 which is located nearest to the engaging recess 103 is arranged such that when the first turnable member 3' is turned a predetermined angle $\alpha 1$ from the closed position, the ball 101 is fitted to the specific first fitting recess 111. The remaining first fitting recesses 111 are arranged away from each other by an angle $\beta$ in the circumferential direction of the first turnable member 3'. In this embodiment, the angles are set such that $\alpha 1=90$ degrees and $\beta 1=20$ degrees. The diameter of the first fitting recess 111 at the outer surface of the first turnable member 3' is set to be longer than the length corresponding to the angle $\beta 1$ of the circumference on which the fitting recesses 111 are arranged. As a consequence, the end portions of the adjacent first fitting recesses 111, 111 in the circumferential direction of the first turnable member 3' are overlapped with each other.

The first fitting recesses 112 each have a bottom surface whose radius of curvature is generally equal to the radius of the ball 102 so that the ball 102 is detachably fitted thereto. Moreover, the first fitting recesses 112 are point symmetrically arranged with the corresponding first fitting recesses 111 with respect to the axis of the first turnable member 3'. Accordingly, at the position where the first turnable member 3' is turned by an angle $\alpha 1$ from the closed position and at those positions where the first turnable member 3' is turned further therefrom by an angle $\beta 1$ each time, the ball 102 is fitted to the respective fitting recesses 112.

Second fitting recesses (second recesses) 113, 114 are formed in that surface of the second turnable member 5' where the engaging recesses 103, 104 are formed. The number of the second fitting recesses 113, 114 is equal to that of the fitting recesses 111, 112. Accordingly, the number of each of the second fitting recesses 113, 114 is three in this embodiment.

The second fitting recess 113, which is located nearest to the engaging recess 103, is arranged away from the closed position by a predetermined angle $\alpha 2$. The angle $\alpha 2$ is set to $\alpha 1 \pm \beta 1/2$. Particularly, in this embodiment, the angle is set such that $\alpha 2=\alpha 1+\beta 1/2=100$ degrees. The two second fitting recesses 113, 113, which are adjacent in the circumferential direction of the second turnable member 5', are arranged away from each other by an angle $\beta 1$ (=20 degrees). Accordingly, the respective second fitting recesses 113 are arranged in such a manner as to be displaced in phase by $\beta 1/2=10$ degrees in the circumferential direction of the turnable member 3' and the second turnable member 5' with respect to the respective fitting recesses 111. That is, the first fitting recesses 111 and the second fitting recesses 113 are alternately arranged at predetermined intervals in the circumferential direction of the first and second turnable members 3', 5'. On the other hand, the second fitting recesses 114 are point symmetrically arranged with the second fitting recesses 113 with respect to the axis of the second turnable member 5'. Accordingly, the second fitting recesses 114 each are arranged in such a manner as to be displaced in phase by $\beta 1/2$ with respect to the first fitting recesses 112. All the remaining construction of the second fitting recesses 113, 114 is same as the first fitting recesses 111, 112.

In the cellular telephone having the first turnable member 3' and the second turnable member 5' thus constructed, when the reception section C is turned from the closed position towards the open position side and thus, the first and second turnable members 3', 5' are turned 90 degrees from the closed position towards the open position side, the balls 101, 102 are fitted to the first fitting recesses 111, 112, respectively. Thereafter, every time the first and second turnable members 3', 5' are turned by $\beta 1/2=10$ degrees towards the open position side, the balls 101, 102 are alternately fitted to the second fitting recesses 113, 114 and the first fitting recesses 111, 112. When the first and second turnable members 3', 5' are turned about 160 degrees, the balls 101, 102 are contacted with the second inclination surfaces 107, 108 of the engaging recesses 103, 104, respectively, thereby reaching the open position. When the first and second turnable members 3', 5' are to be turned from the open position towards the closed position side, the balls 101, 102 are fitted to the first fitting recesses 111, 112 and the second fitting recesses 113, 114 in the reverse order from the above case.

In the hinge assembly of this embodiment, since the first fitting recesses 111, 112 and the second fitting recesses 113, 114 are arranged between the engaging recesses 103, 104, by fitting the balls 101, 102 to the first fitting recesses 113, 114 and the second fitting recesses 113, 114, respectively, the first and second turnable members 3', 5' can be stopped with a feel of click and thus, the reception section C can be stopped with a feel of click. Particularly, in this embodiment, since the first fitting recesses 111, 112 and the second fitting recesses 113, 114 are arranged in such a manner as to be displaced in phase so that the first fitting recesses 111, 112 and the second fitting recesses 113, 114 are mutually located at an intermediate position, the number of positions where the reception section C is stopped can be increased.

The first fitting recesses 111, 112 and the second fitting recesses 113, 114 may be arranged in the same positions in the circumferential direction of the first and second turnable members 3', 5'. In case an arrangement is made in that way, since the balls 101, 102 are simultaneously fitted to the first fitting recesses 111, 112 and the second fitting recesses 113, 114, the first and second turnable members 3', 5' and the reception section C can be stopped with a stronger feel of click. This is also true in the next embodiment which is to be described hereinafter.

Figure 16:
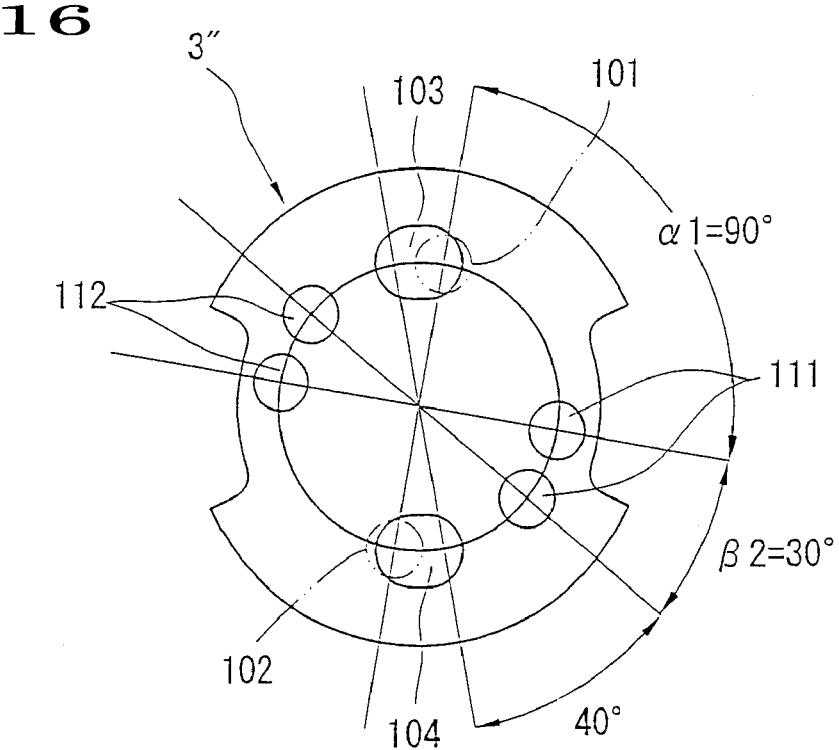
FIG. 16 is a plan view showing a first turnable member in a fifth embodiment of a hinge assembly according to the present invention.
Figure 17:
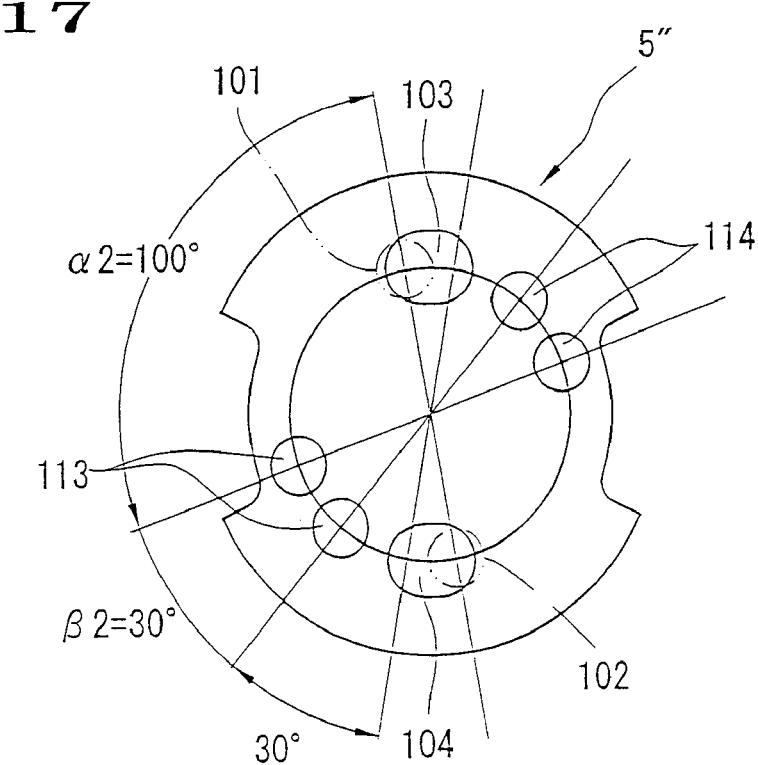
FIG. 17 is a plan view showing a second turnable member in a fifth embodiment of a hinge assembly according to the present invention.

FIGS. 16 and 17 show a fifth embodiment of the present invention. This embodiment is a modification of the embodiment shown in FIGS. 14 and 15. In this embodiment, a first turnable member 3" shown in FIG. 16 is used instead of the first turnable member 3' and a second turnable member 5" shown in FIG. 17 is used instead of the second turnable member 5'. All the remaining construction is same as the hinge assembly 1. Therefore, only the first and second turnable members 3", 5" will be described in this embodiment.

A plural pieces each of first fitting recesses 111, 112 are also formed in the first turnable member 3". However, different from the above embodiment, in this embodiment, two pieces each of the first fitting recesses 111, 112 are formed. The first fitting recesses 111, 111 are arranged away from one another by an angle β2 in the circumferential direction. The angle β2 is set such that the length corresponding to the angle β2 of the circumference on which the fitting recesses 111 are arranged, is longer than the diameter of the first fitting recess 111. In this embodiment, the angle is set such that β2=30 degrees. Accordingly, the first fitting recesses 111, 111 each as an entirety are located away from each other without allowing their end portions in the circumferential direction of the first turnable member 3" to be overlapped with each other. The first fitting recesses 112 are, likewise, arranged away by an angle β2 in the circumferential direction of the second turnable member 5".

Plural pieces each of the second fitting recesses 113, 114 are formed in the second turnable member 5". In this embodiment, two pieces each of the second fitting recesses 113, 114 are formed. The second fitting recesses 113, 114 are arranged such that they are located away from each other by an angle β2 in the circumferential direction of the second turnable member 5" and they are displaced in phase by an angle β2/2 with respect to the first fitting recesses 111, 112.

The present invention is not limited to the above embodiments. Instead many changes and modifications can be made in accordance with necessity.

For example, in the above embodiment, the hinge assembly 1 according to the present invention is applied to the cellular telephone A. The hinge assembly 1 can likewise be used between other two goods which are to be turnably connected to each other.

Moreover, in the above embodiments, although only the second turnable member 5 is non-turnably connected to the reception section C, both the first and second turnable members 3, 5 or only the first turnable member 3 may be non-turnably connected to the reception section C. In case the first turnable member 3 is non-turnably connected to the reception section C, a receiving cylindrical portion, which is located adjacent to the right end face of the first receiving cylindrical portion B1 of the transmission section B, is formed at the reception section C, a key portion is formed at this receiving cylindrical portion, and the key portion is fitted to the key groove 31 of the first turnable member 3.

Furthermore, in the above embodiments, the hinge assembly 1 is used in the cellular telephone A. Therefore, although the first inclination surfaces (cam faces) 105, 106 for converting the biasing force of the coiled spring 9 into a turn biasing force for turn biasing the first turnable member 3 (second turnable member 5) towards the closed position side and the second inclination surfaces (cam faces) 107, 108 for converting the biasing force of the coiled spring 9 into a turn biasing force for turning the first turnable member 3 (second turnable member 5) towards the open position side are used, only one of them may be used.

INDUSTRIAL APPLICABILITY

The hinge assembly according to the present invention can be used as a hinge assembly for interconnecting two goods such as a main body and a cover member of a cellular telephone and a personal computer, and for turn biasing one of the two goods into a predetermined turning position.

What is claimed is:

1. A hinge assembly comprising a hinge main body, a turnable member turnably disposed at one end side of said hinge main body, a movable member disposed at one end portion of said hinge main body such that said movable member is movable in a direction of a rotation axis of said turnable member, but said movable member is non-turnable with respect to said hinge main body and arranged opposite an end face of said turnable member which is oriented towards the other end side of said hinge main body, and bias means for urging said movable member so as to abut with said turnable member, one of an abutment surface of said turnable member and an abutment surface of said movable member being provided with a projection and an other abutment surface being provided with a cam face for converting a biasing force of said bias means into a turn biasing force for turning said turnable member in one direction by abutment of said cam face with said projection when said turnable member is turned into a predetermined position, characterized in that said hinge assembly further comprises a second turnable member turnably disposed at the other end side of said hinge main body with an axis thereof aligned with said turnable member and non-turnably connected to said turnable member, and a second movable member disposed at the other end portion of said hinge main body such that said second movable member is movable in a direction of a rotation axis of said second turnable member, but said second movable member is non-turnable with respect to said hinge main body and urged by said bias means so as to abut with an end face of said second turnable member which is oriented towards one end side of said hinge main body, one of an abutment surface of said second turnable member and an abutment surface of said second movable member being provided with a second projection and an other abutment surface being provided with a second cam face for converting a biasing force of said bias means into a turn biasing force which acts in the same direction as the turn biasing force converted by said cam face when said turnable member is turned into said predetermined position.

2. A hinge assembly according to claim 1, wherein said turnable member and said second turnable member are non-turnably and non-movably disposed at opposite end portions of a connection shaft which is turnably pierced through said hinge main body.

3. A hinge assembly according to claim 2, wherein one of said turnable member and said second turnable member is integrally formed on said connection shaft.

4. A hinge assembly according to claim 3, wherein a fitting recess is formed in said abutment surface on which said cam face is formed, said fitting recess allows said projection to be detachably fitted in said fitting recess in accordance with relative turning motion of said turnable member and said movable member, and a second fitting recess is formed in said abutment surface on which said cam face is formed, said second fitting recess allows said second projection to be detachably fitted in said second fitting recess in accordance with relative turning motion of said second turnable member and said second movable member.

5. A hinge assembly according to claim 4, wherein a plurality of said fitting recesses are formed, said fitting recesses are arranged on a circumference about the axis of said turnable member in such a manner as to be away from one another, a plurality of said second fitting recesses are formed, said second fitting recesses are arranged on a circumference about the axis of said second turnable member in such a manner as to be away from one another.

6. A hinge assembly according to claim 5, wherein said fitting recesses and said second fitting recesses are arranged at different positions, respectively in the circumferential directions of said turnable member and said second turnable member, so that said fitting recesses and said second fitting recesses are alternately located in the circumferential directions.

7. A hinge assembly according to claim 5, wherein said fitting recesses and said second fitting recesses are arranged at same positions, respectively, in the circumferential directions of said turnable member and said second turnable member.

8. A hinge assembly according to claim 1, wherein a fitting recess is formed in said abutment surface on which said cam face is formed, said fitting recess allows said projection to be detachably fitted in said fitting recess in accordance with relative turning motion of said turnable member and said movable member, and a second fitting recess is formed in said abutment surface on which said cam face is formed, said second fitting recess allows said second projection to be detachably fitted in said second fitting recess in accordance with relative turning motion of said second turnable member and said second movable member.

9. A hinge assembly according to claim 2, wherein a fitting recess is formed in said abutment surface on which said cam face is formed, said fitting recess allows said projection to be detachably fitted in said fitting recess in accordance with relative turning motion of said turnable member and said movable member, and a second fitting recess is formed in said abutment surface on which said cam face is formed, said second fitting recess allows said second projection to be detachably fitted in said second fitting recess in accordance with relative turning motion of said second turnable member and said second movable member.

10. A hinge assembly according to claim 9, wherein a plurality of said fitting recesses are formed, said fitting recesses are arranged on a circumference about the axis of said turnable member in such a manner as to be away from one another, a plurality of said second fitting recesses are formed, said second fitting recesses are arranged on a circumference about the axis of said second turnable member in such a manner as to be away from one another.

11. A hinge assembly according to claim 10, wherein said fitting recesses and said second fitting recesses are arranged at different positions, respectively in the circumferential directions of said turnable member and said second turnable member, so that said fitting recesses and said second fitting recesses are alternately located in the circumferential directions.

12. A hinge assembly according to claim 10, wherein said fitting recesses and said second fitting recesses are arranged same positions, respectively, in the circumferential directions of said turnable member and said second turnable member.

13. A hinge assembly according to claim 8, wherein a plurality of said fitting recesses are formed, said fitting recesses are arranged on a circumference about the axis of said turnable member in such a manner as to be away from one another, a plurality of said second fitting recesses are formed, said second fitting recesses are arranged on a circumference about the axis of said second turnable member in such a manner as to be away from one another.

14. A hinge assembly according to claim 13, wherein said fitting recesses and said second fitting recesses are arranged at different positions, respectively in the circumferential directions of said turnable member and said second turnable member, so that said fitting recesses and said second fitting recesses are alternately located in the circumferential directions.

15. A hinge assembly according to claim 13, wherein said fitting recesses and said second fitting recesses are arranged at same positions, respectively, in the circumferential directions of said turnable member and said second turnable member.

* * * * *

UNITED STATES PATENT AND TRADEMARK OFFICE
CERTIFICATE OF CORRECTION

PATENT NO. : 6,785,936 B2
DATED : September 7, 2004
INVENTOR(S) : Koshikawa

It is certified that error appears in the above-identified patent and that said Letters Patent is hereby corrected as shown below:

<u>Column 18,</u>
Line 20, after "said second fitting recesses are arranged", insert the word -- at --, so that the passage reads, "... said second fitting recesses are arranged at same positions..."

Signed and Sealed this

Third Day of May, 2005

JON W. DUDAS
*Director of the United States Patent and Trademark Office*